(12) United States Patent
Liao

(10) Patent No.: US 10,819,076 B2
(45) Date of Patent: Oct. 27, 2020

(54) ROTATABLE DEVICE POWERED BY CONTINUED ELECTRICITY SUPPLY AND A WINDMILL USING SAID ROTATABLE DEVICE

(71) Applicant: Quanzhou Great Electronic Technology Co., Ltd., Fujian (CN)

(72) Inventor: Baozhang Liao, Fujian (CN)

( * ) Notice: Subject to any disclaimer, the term of this patent is extended or adjusted under 35 U.S.C. 154(b) by 151 days.

(21) Appl. No.: 15/996,535

(22) Filed: Jun. 4, 2018

(65) Prior Publication Data

US 2018/0358769 A1    Dec. 13, 2018

(30) Foreign Application Priority Data

Jun. 7, 2017    (CN) .......................... 2017 1 0424929

(51) Int. Cl.
| | | |
|---|---|---|
| H01R 39/64 | (2006.01) | |
| H01R 39/02 | (2006.01) | |
| H01R 39/08 | (2006.01) | |
| F21V 23/06 | (2006.01) | |
| F21V 23/00 | (2015.01) | |
| A63H 33/40 | (2006.01) | |
| F21V 33/00 | (2006.01) | |
| F21Y 107/50 | (2016.01) | |
| F21L 4/08 | (2006.01) | |

(52) U.S. Cl.
CPC ......... H01R 39/643 (2013.01); F21V 23/002 (2013.01); F21V 23/06 (2013.01); H01R 39/02 (2013.01); H01R 39/08 (2013.01); *A63H 33/40* (2013.01); *F21L 4/08* (2013.01); *F21V 33/008* (2013.01); *F21Y 2107/50* (2016.08)

(58) Field of Classification Search
CPC ........ F21V 33/096; F21V 23/00; F21V 23/06; H01R 39/00; H01R 39/02; H01R 39/08; H01R 39/12; H01R 39/18; H01R 39/60; H01R 39/64; G09F 13/00; F04D 25/08; F04D 25/088
USPC ................ 310/219, 231, 232; 362/35; 416/5
See application file for complete search history.

(56) References Cited

U.S. PATENT DOCUMENTS

| | | | | |
|---|---|---|---|---|
| 3,681,589 A * | 8/1972 | Roberts | .................. | F21S 10/06 40/432 |
| 5,082,422 A * | 1/1992 | Wang | .................... | F04D 25/088 362/234 |
| 5,588,843 A * | 12/1996 | Sobhani | ................. | H01R 39/64 439/13 |
| 6,036,331 A * | 3/2000 | Acquisto | ............... | F04D 29/005 362/96 |
| 6,089,875 A * | 7/2000 | Iwata | ..................... | H01R 39/14 439/23 |
| 6,186,796 B1 * | 2/2001 | Wedge | .................. | H01R 35/04 340/949 |

(Continued)

*Primary Examiner* — Burton S Mullins

(74) *Attorney, Agent, or Firm* — Prakash Nama; Global IP Services, PLLC

(57) ABSTRACT

A rotatable device powered by continued electricity supply, having a supporting shaft, a bearing, a rotary body, a mounting seat, an electrical conductive member, and a brush. The bearing includes an outer ring and an inner ring. The rotary body is connected to the outer ring. One of the electrical conductive member and the brush is connected to the rotary body, and another one of the electrical conductive member and the brush is connected to the mounting seat. A windmill that uses the rotatable device is also provided.

4 Claims, 8 Drawing Sheets

(56) References Cited

U.S. PATENT DOCUMENTS

| | | | |
|---|---|---|---|
| 7,601,005 B1 * | 10/2009 | Lai | F04D 25/088 439/12 |
| 2003/0082062 A1 * | 5/2003 | Chen | F04D 25/166 417/423.5 |
| 2003/0210982 A1 * | 11/2003 | Chen | F04D 25/088 416/5 |
| 2004/0119369 A1 * | 6/2004 | Radtke | H01R 39/64 310/232 |

* cited by examiner

ROTATABLE DEVICE POWERED BY
CONTINUED ELECTRICITY SUPPLY AND A
WINDMILL USING SAID ROTATABLE
DEVICE

BACKGROUND OF THE INVENTION

The present invention relates to a rotatable device powered by continued electricity supply and a windmill using said rotatable device.

In order to rotate a lamp, a lamp base of the lamp will be generally fixed on an output shaft of a motor. To prevent tangling wire during rotation of the lamp, a power supply that provides electricity to the lamp is generally fixed on the lamp base. However, the structural configurations described above create heavy loads on the output shaft of the motor, thus resulting in a reduced service life of the motor after a long period of use. Also, it is quite troublesome to dismount the lamp. In some rotatable windmills now available in the market, light strips are generally provided on the blades of a windmill so that the blades can illuminate; also, a power supply is provided on the rotary body of the windmill, the blades of the windmill are connected onto the rotary body, and the light strips are electrically connected to the power supply. However, the structural configurations just described also create heavy loads on the rotary body of the windmill, thus increasing the resistance of the rotation of the rotary body and reducing the service life of the rotary body.

The present invention is invented in view of the aforesaid disadvantages now present in the prior art.

BRIEF SUMMARY OF THE INVENTION

An object of the present invention is to provide a rotatable device powered by continued electricity supply. The rotatable device has a simple structure and a low production cost, and can prevent tangling wire during rotation and increase the service life of the rotary body.

Another object of the present invention is to provide a windmill that uses said rotatable device. Said windmill can rotate and illuminate. Also, the windmill has reasonable configurations which prevent tangling wire.

The present invention is achieved as described below.

A rotatable device powered by continued electricity supply, comprising a supporting tube, a bearing that sleeves on the supporting tube, a rotary body connected to the bearing, a mounting seat mounted on the supporting tube, an electrical conductive member and a brush that cooperates with the electrical conductive member; the bearing comprises an outer ring and an inner ring that are mutually rotatable with respect to each other. The rotary body is connected to the outer ring; one of the electrical conductive member and the brush is connected to the rotary body, and another one of the electrical conductive member and the brush is connected to the mounting seat.

Preferably, the mounting seat comprises a sleeve portion that sleeves on the supporting tube, a first electrical conductive ring that sleeves on the sleeve portion, an insulating sleeve that sleeves on the sleeve portion, a second electrical conductive ring that sleeves on the sleeve portion, and a position limiting sleeve that sleeves on the sleeve portion; the insulating sleeve is positioned between the first electrical conductive ring and the second electrical conductive ring; the first electrical conductive ring and the second electrical conductive ring form the electrical conductive member; the brush comprises a first brush cooperating with the first electrical conductive ring and a second brush cooperating with the second electrical conductive ring; one end of the sleeve portion along an axial direction thereof abuts against an end surface of the inner ring along an axial direction thereof, and another end of the sleeve portion along the axial direction thereof is provided with a position limiting member that prevents the mounting seat from falling off from the supporting tube.

Preferably, an outer wall of the supporting tube is provided with a supporting platform which the inner ring abuts against; one end of the inner ring along the axial direction thereof abuts against the supporting platform, another end of the inner ring along the axial direction thereof abuts against the sleeve portion.

Preferably, the sleeve portion is mounted on the supporting tube in a way that the sleeve portion is not rotatable with respect to the supporting tube, the first electrical conductive ring is mounted on the sleeve portion in a way that the first electrical conductive ring is not rotatable with respect to the sleeve portion, and the second electrical conductive ring is mounted on the sleeve portion in a way that the second electrical conductive ring is not rotatable with respect to the sleeve portion.

Preferably, an outer wall of the sleeve portion is provided with a first key slot and a second key slot running along the axial direction of the sleeve portion; an inner wall of the first electrical conductive ring is provided with a first key that matches with the first key slot; an inner wall of the second electrical conductive ring is provided with a second key that matches with the second key slot.

Preferably, the outer wall of the sleeve portion is also provided with a first conductive wire slot and a second conductive wire slot running along the axial direction of the sleeve portion; the inner wall of the first electrical conductive ring is disposed corresponding to the first conductive wire slot; the inner wall of the second electrical conductive ring is disposed corresponding to the second electrical conductive wire slot.

Preferably, the outer wall of the supporting tube is provided with a threaded portion; the position limiting member is a nut threaded to the supporting tube.

Preferably, the rotary body comprises a first cover body and a second cover body; a first clamping portion is formed on the first cover body; a second clamping portion is formed on the second cover body; two ends of the outer ring along the axial direction thereof abut against the first clamping portion and the second clamping portion respectively; the first cover body and the second cover body are fixed together with each other by screws.

Preferably, the rotatable device also comprises a sleeve cover; the sleeve cover is fixed to the first cover body by screws; the mounting seat is disposed inside the sleeve cover and extends out of the sleeve cover; an accommodation cavity is provided between an inner wall of the sleeve cover and an outer wall of the mounting seat.

Preferably, a first installation portion is provided on the first cover body; one end of the first electrical conductive ring is connected with the first installation portion, another end of the first electrical conductive ring passes through the sleeve cover and extends into the accommodation cavity; one end of the second electrical conductive ring is connected with a second installation portion, another end of the second electrical conductive ring passes through the sleeve cover and extends into the accommodation cavity.

The present invention also provides a windmill, comprising a supporting shaft, a rotary body provided on the supporting shaft, blades provided on the rotary body, lights provided on the blades, and a power supply that supplies power to the lights; the supporting shaft is a supporting tube; a bearing sleeves on the supporting tube; the bearing comprises an outer ring and an inner ring that are mutually rotatable with respect to each other; the rotary body is connected with the outer ring; the windmill also comprises a mounting seat mounted on the supporting tube, an electrical conductive member, and a brush cooperating with the electrical conductive member; one of the electrical conductive member and the brush is connected to the rotary body, and another one of the electrical conductive member and the brush is connected to the mounting seat.

Preferably, the power supply comprises a power supply seat and a solar battery component disposed on the power supply seat; a side wall of the power supply seat is provided with a threaded hole; the supporting tube is laterally threaded into the threaded hole; the electrical conductive member and the solar battery component are electrically connected via a first conductive wire; the first conductive wire is arranged inside the supporting tube; the lights are electrically connected to the brush via a second conductive wire.

According to the present invention, the rotary body and the brush will rotate along with the outer ring of the bearing when the present invention is in use. During rotation, the brush keeps brushing the electrical conductive member and maintains electrical contact with the electrical conductive member. Conductive wires are arranged inside the supporting tube and are connected to the power supply. The supporting tube and the inner ring of the bearing do not rotate when the present invention is in use in order to prevent tangling wire and reduce the loads on the rotary body, thereby ensuring long service life of the rotary body. The present invention has the advantages of simple structure and low production cost.

The windmill according to the present invention enables rotational electrical contact between the lights on the blades and the power supply during rotation of the blades via cooperation between the electrical conductive member and the brush, thereby preventing tangling wire and ensuring smooth rotation and proper illumination of the windmill.

| | |
|---|---|
| 10-supporting tube | 11-supporting platform |
| 20-bearing | 21-outer ring |
| 22-inner ring | 30-rotary body |
| 31-first cover body | 32-second cover body |
| 33-sleeve cover | 311-bearing seat |
| 34-first clamping portion | 35-second clamping portion |
| 36-first installation portion | 37-second installation portion |
| 41-sleeve portion | 411-first key slot |
| 412-second key slot | 413-first conductive wire slot |
| 414-second conductive wire slot | 415-narrow neck portion |
| 42-first electrical conductive ring | 421-first key |
| 43-insulating sleeve | 44-second electrical conductive ring |
| 441-second key | 45-position limiting sleeve |
| 46-position limiting member | 51-first brush |
| 52-second brush | 60-blades |
| 70-lights | 80-power supply seat |
| 81-solar battery component | 90-end cap |
| 101-wiring channel | |
| 102-wires | |
| 103-accommodation cavity | |

DETAILED DESCRIPTION OF THE INVENTION

The technical solution of the present invention is further explained below. The present invention will be further described in detail below with reference to the accompanying drawings.

Figure 1:
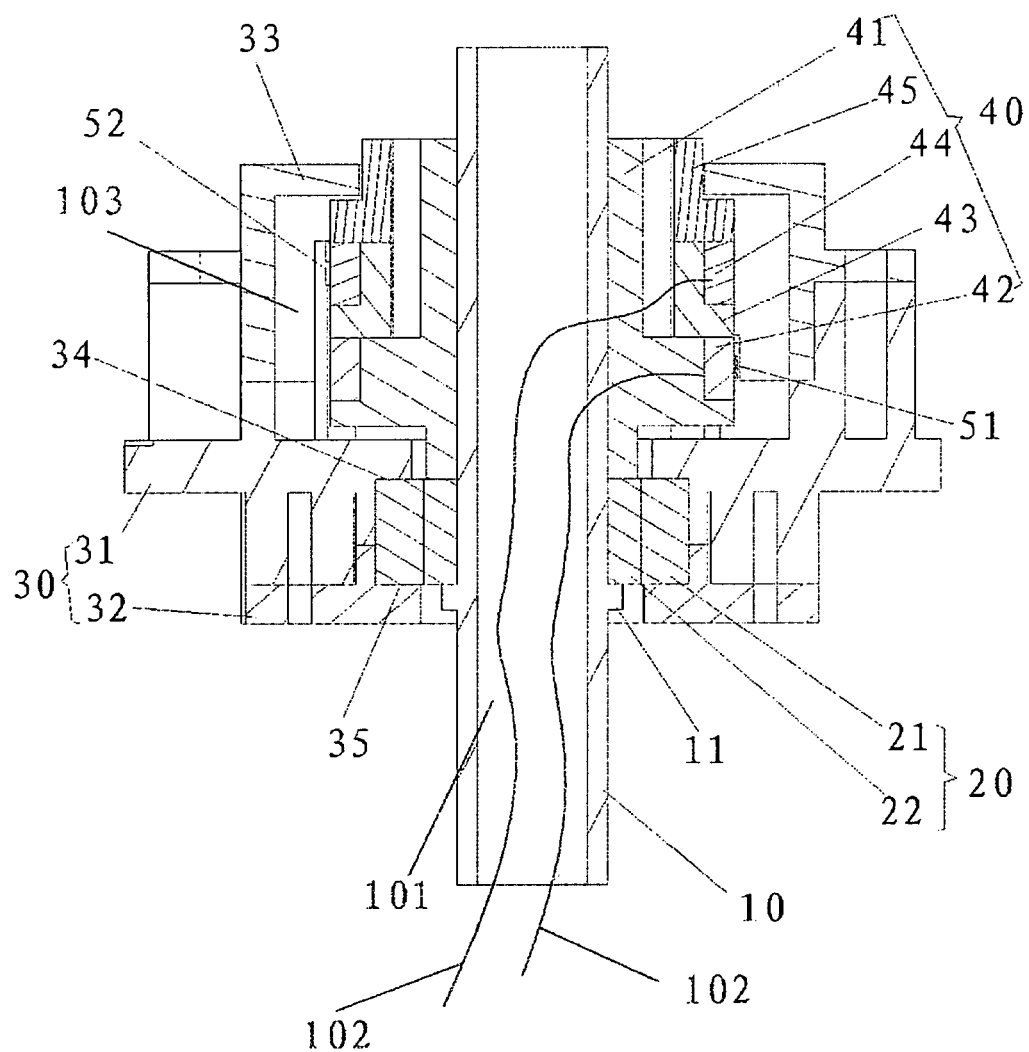
FIG. 1 is a cross sectional view showing the structure of the rotatable device of the present invention (the position limiting member is omitted).
Figure 2:
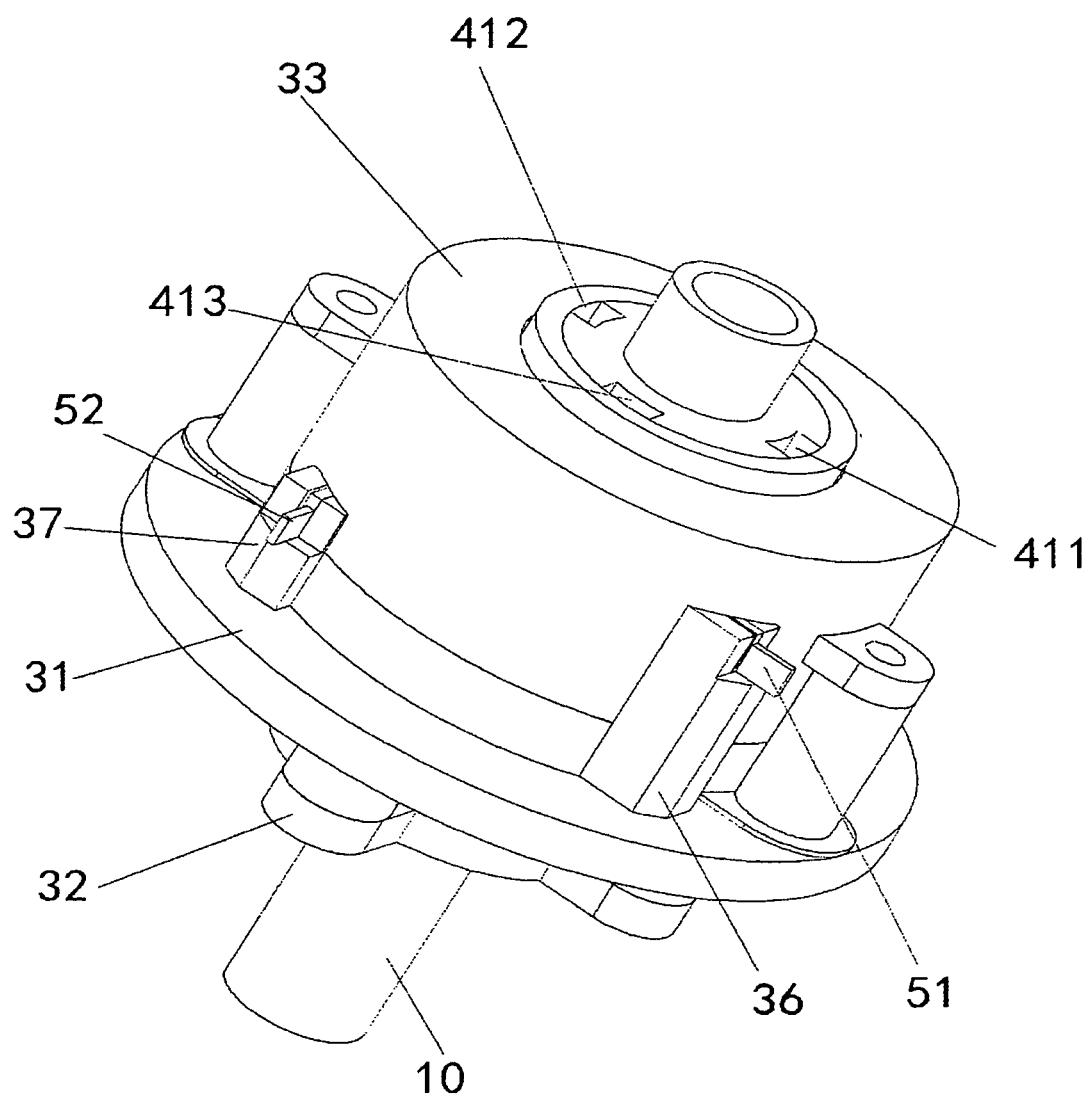
FIG. 2 is a perspective structural view of the rotatable device of the present invention.
Figure 3:
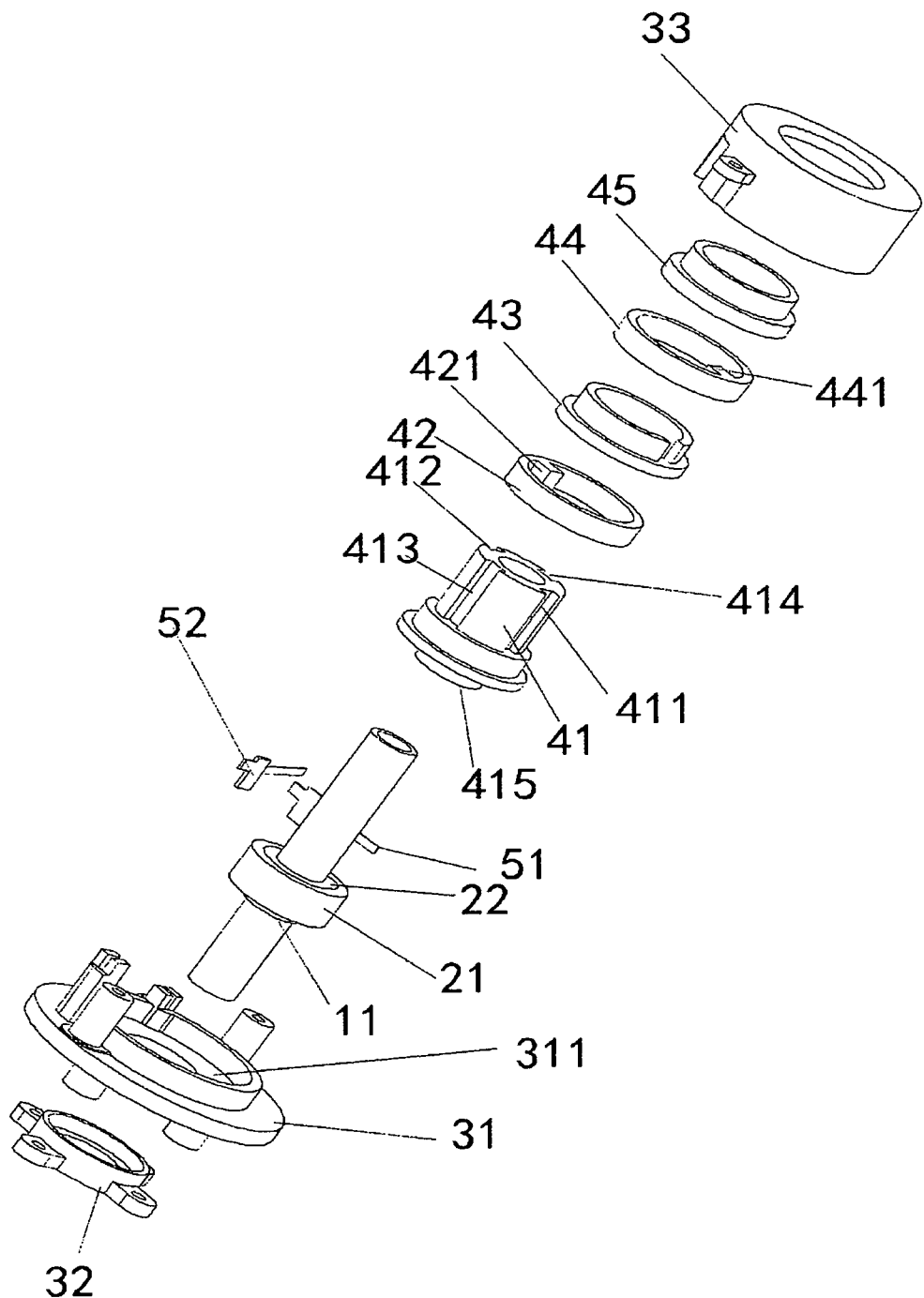
FIG. 3 is an exploded structural view of the rotatable device of the present invention.
Figure 4:
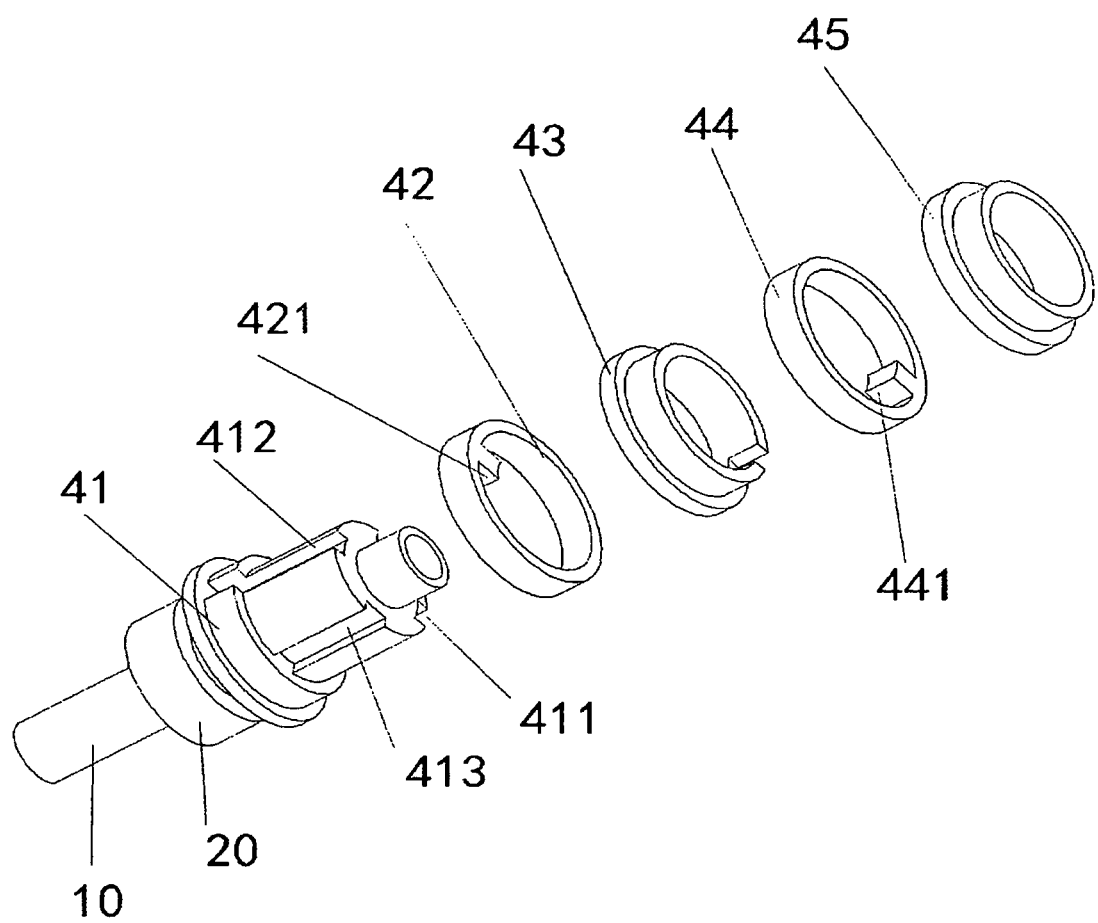
FIG. 4 is an exploded structural view that partially illustrates the structure of the rotatable device.
Figure 5:
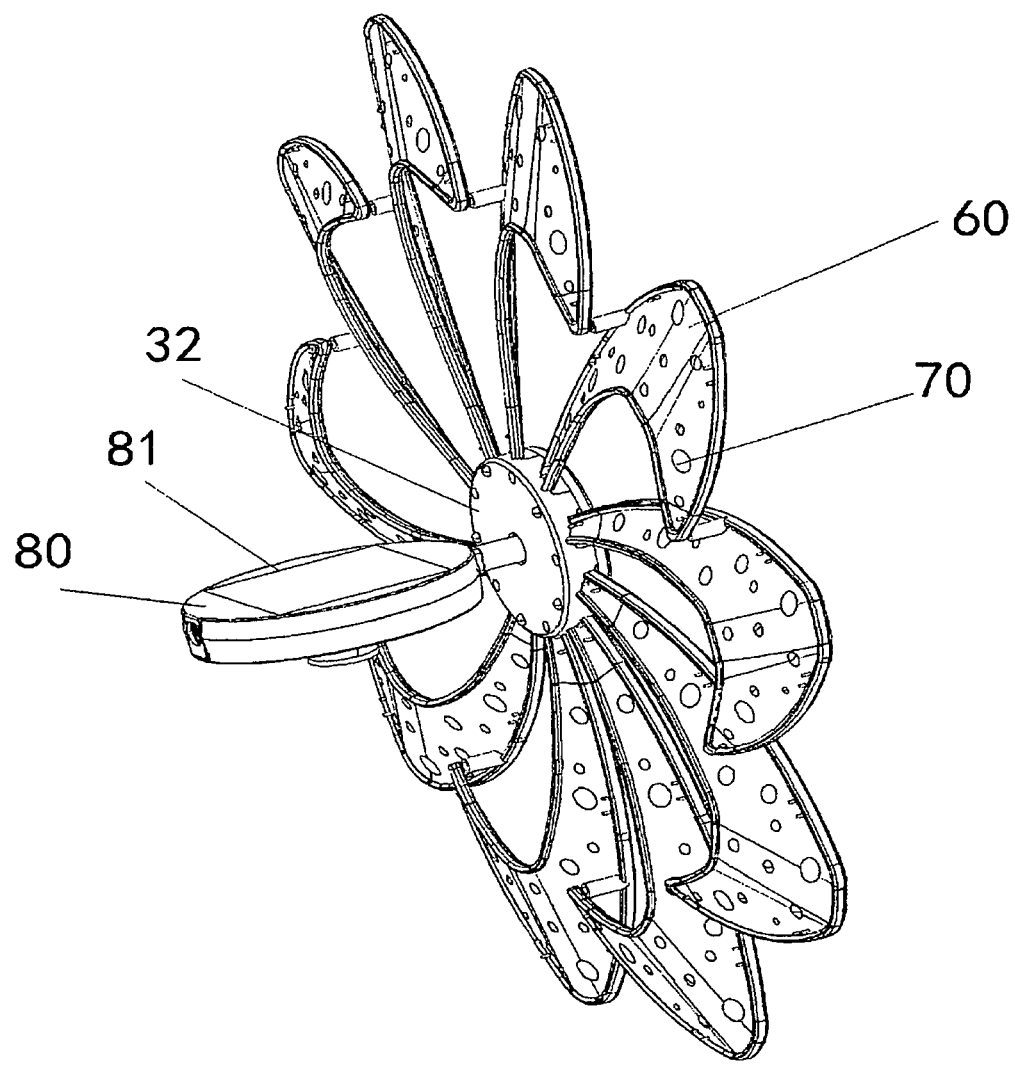
FIG. 5 is a structural view of the windmill of the present invention.
Figure 6:
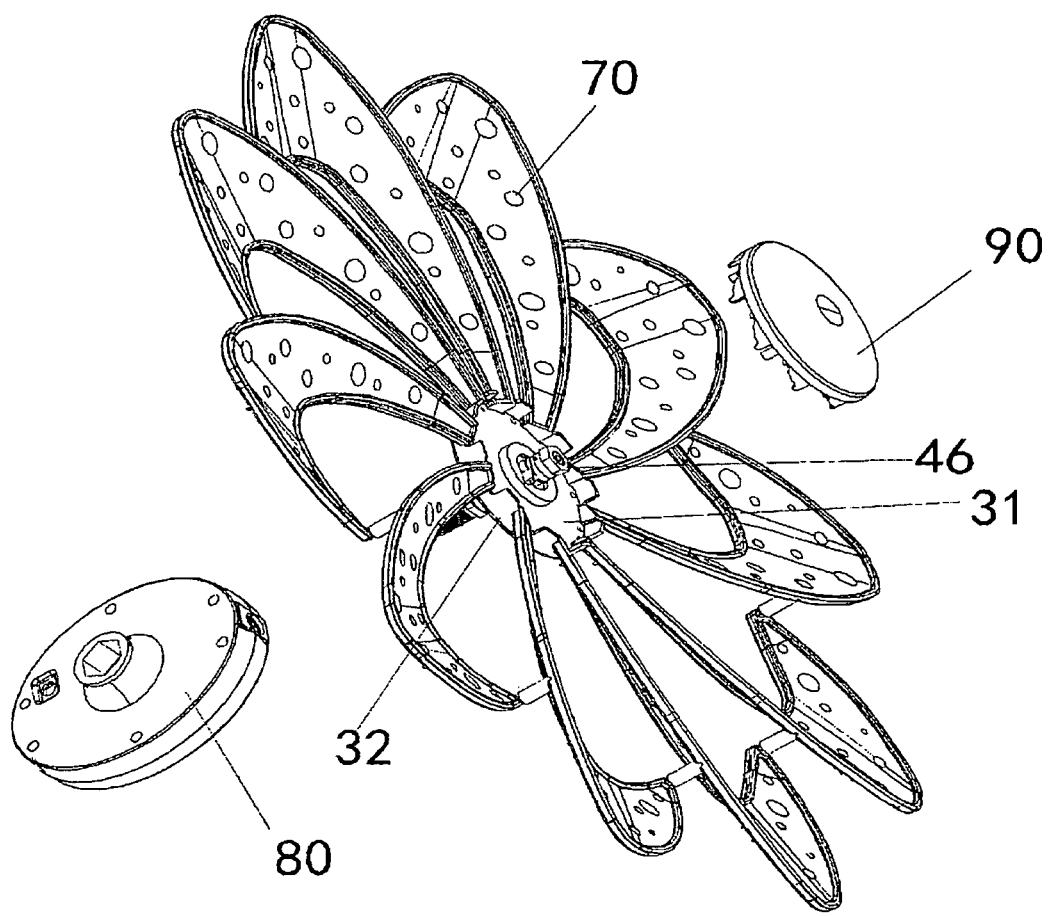
FIG. 6 is a partially exploded view of the windmill of the present invention.
Figure 7:
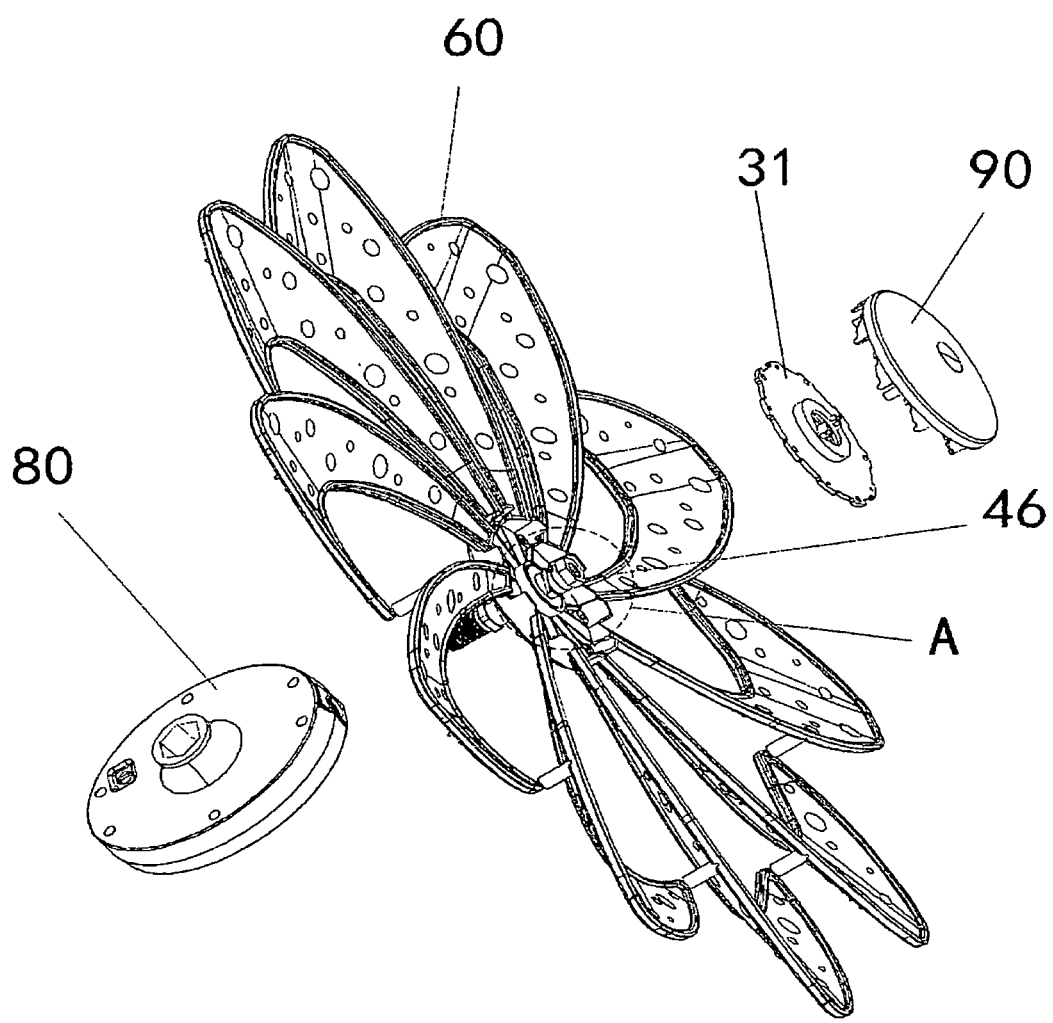
FIG. 7 is another partially exploded view of the windmill of the present invention.
Figure 8:
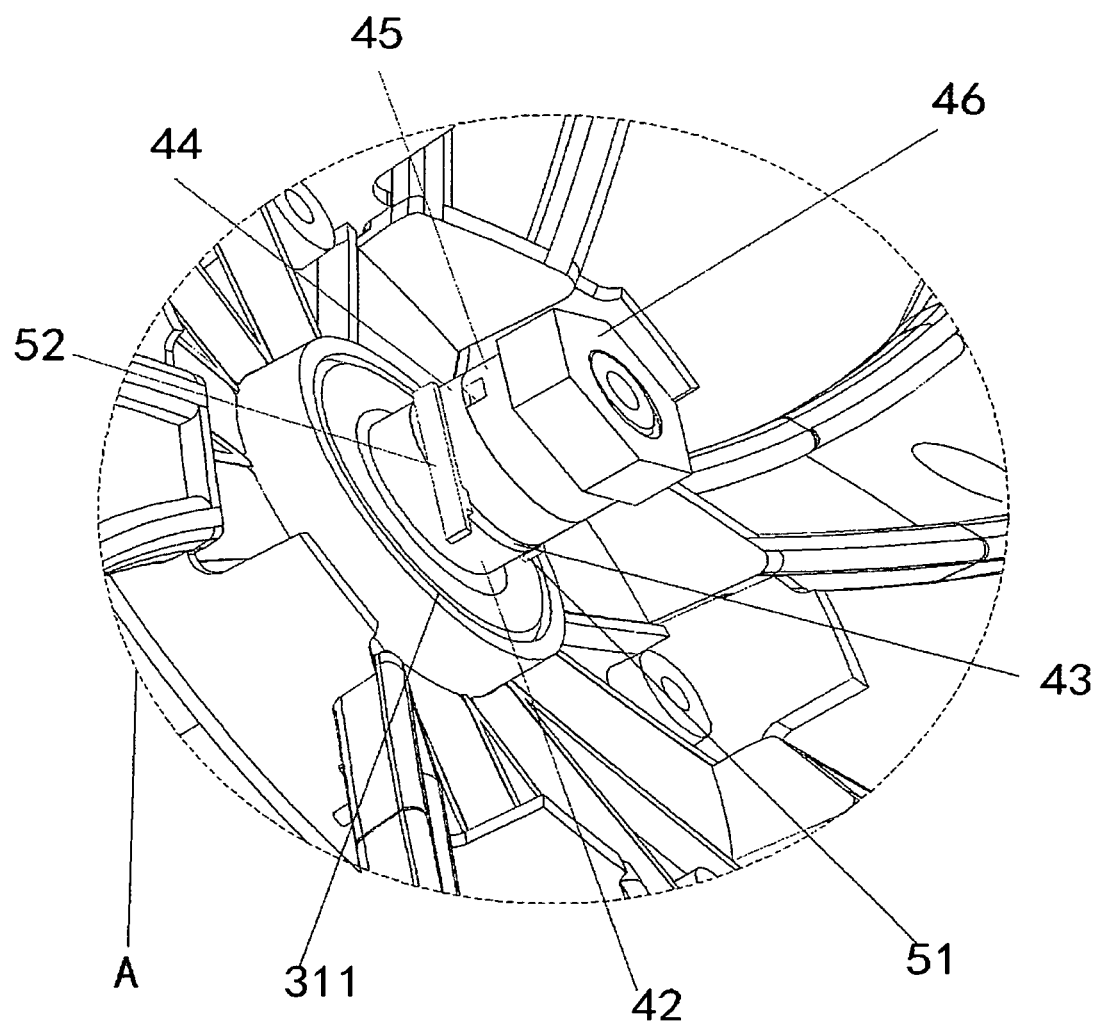
FIG. 8 is an enlarged view of portion A marked in FIG. 7.

With reference to FIGS. 1-8, a rotatable device powered by continued electricity supply comprises a supporting shaft, a bearing 20 that sleeves the supporting shaft, a rotary body 30 connected to the bearing 20, a mounting seat 40 mounted on the supporting shaft, an electrical conductive member and a brush that cooperates with the electrical conductive member. The bearing 20 comprises an outer ring 21 and an inner ring 22 that are mutually rotatable with respect to each other. The rotary body 30 is connected to the outer ring 21 and rotates along with outer ring 21. One of the electrical conductive member and the brush is connected to the rotary body 30, and another one of the electrical conductive member and the brush is connected to the mounting seat 40. A wiring channel 101 is provided on the supporting shaft for arrangement of wires 102.

Preferably, the supporting shaft is a supporting tube 10. An inner wall of the support tube defines the wiring channel used for arrangement of wires. The mounting seat 40 comprises a sleeve portion 41 that sleeves on the supporting tube 10, a first electrical conductive ring 42 that sleeves on the sleeve portion 41, an insulating sleeve 43 that sleeves on the sleeve portion 41, a second electrical conductive ring 44 that sleeves on the sleeve portion 41, and a position limiting sleeve 45 that sleeves on the sleeve portion 41. The sleeve portion 41, the first electrical conductive ring 42, the second electrical conductive ring 44 and the position limiting sleeve 45 are co-axial. The insulating sleeve 43 is positioned between the first electrical conductive ring 42 and the second electrical conductive ring 44 to separate the first electrical conductive ring 42 and the second electrical conductive ring 44 and thereby preventing the electrical contact between the first electrical conductive ring 42 and the second electrical conductive ring 44. The first electrical conductive ring 42 and the second electrical conductive ring 44 form the electrical conductive member. The brush comprises a first brush 51 cooperating with the first electrical conductive ring 42 and a second brush 52 cooperating with the second electrical conductive ring 44. The first brush 51 and the second brush 52 are each formed by a resilient metal plate. One end of the sleeve portion 41 along an axial direction thereof abuts against an end surface of the inner ring 22 along an axial direction thereof, and another end of the sleeve portion 41 along the axial direction thereof is provided with a position limiting member 46 that prevents the mounting seat 40 from falling off from the supporting tube 10.

In the present invention, the supporting shaft can also be a supporting rod; a surface of the supporting rod is provided with wiring channels in which wires can be arranged.

Preferably, an outer wall of the supporting tube 10 is provided with a supporting platform 11 which the inner ring 22 abuts against. One end of the inner ring 22 along the axial direction thereof abuts against the supporting platform 11, another end of the inner ring 22 along the axial direction thereof abuts against the sleeve portion 41. Specifically, the inner ring 22 can be fixedly connected to the supporting tube 10, for example via interference fit. A narrow neck portion 415 is formed on the sleeve portion 41. By means of the position limiting member 46, the narrow neck portion 415 abuts against the inner ring 22, so that when the sleeve portion 41 is in use, the sleeve portion 41 will not rotate along with the supporting tube 10. During use, the supporting tube 10 will be generally fixed on a frame together with a power supply seat 81 which will be described below.

Preferably, the sleeve portion 41 is mounted on the supporting tube 10 in a way that the sleeve portion 41 is not rotatable with respect to the supporting tube 10, the first electrical conductive ring 42 is mounted on the sleeve portion 41 in a way that the first electrical conductive ring 42 is not rotatable with respect to the sleeve portion 41, and the second electrical conductive ring 44 is mounted on the sleeve portion 41 in a way that the second electrical conductive ring 44 is not rotatable with respect to the sleeve portion 41.

Preferably, an outer wall of the sleeve portion 41 is provided with a first key slot 411 and a second key slot 412 running along the axial direction of the sleeve portion 41. An inner wall of the first electrical conductive ring 42 is provided with a first key 421 that matches with the first key slot 411. An inner wall of the second electrical conductive ring 44 is provided with a second key 441 that matches with the second key slot 412. Due to the matching relationship between the first key slot 411 and the first key 421, and the matching relationship between the second key 441 and the second key slot 412, the first electrical conductive ring 42 and the second electrical conductive ring 44 do not rotate with respect to the supporting tube 10. The first electrical conductive ring 42 and the second electrical conductive ring 44 are moveable axially with respect to the sleeve portion 41 so that the first electrical conductive ring 42 and the second electrical conductive ring 44 can be dismounted. As an alternative embodiment, the same technical effect can be achieved by providing the first and second key slots at the inner walls of the respective first and second electrical conductive rings, and providing the first and second keys on the sleeve portion 41.

Preferably, the outer wall of the sleeve portion 41 is also provided with a first conductive wire slot 413 and a second conductive wire slot 414. The inner wall of the first electrical conductive ring 42 is disposed corresponding to the first conductive wire slot 413. The inner wall of the second electrical conductive ring 44 is disposed corresponding to the second electrical conductive wire slot 414. During installation, a positive terminal conductive wire (the conductive wire 102 connected with the positive terminal) and a negative terminal conductive wire (the conductive wire 102 connected with the negative terminal) pass through the supporting tube 10 and connect with the first electrical conductive ring 42 and the second electrical conductive ring 44 respectively through the first conductive wire slot 413 and the second conductive wire slot 414 respectively.

Preferably, the outer wall of the supporting tube 10 is provided with a threaded portion. The position limiting member 46 is a nut threaded to the supporting tube 10. By means of the nut, the sleeve portion 41 abuts against the inner ring 22.

Preferably, the rotary body 30 comprises a first cover body 31 and a second cover body 32. A first clamping portion 34 is formed on the first cover body 31. A second clamping portion 35 is formed on the second cover body 32. Two ends of the outer ring 21 along the axial direction thereof abut against the first clamping portion 34 and the second clamping portion 35 respectively. The first cover body 31 and the second cover body 32 are fixed together with each other by screws and clamp the outer ring 21 tightly. According to the structural configurations described above, the first cover body 31 and the second cover body 32 will rotate when the outer ring 21 rotates. In the embodiment that will be described below, a plurality of blades 60 of a windmill are clamped and fixed between the first cover body 31 and the second cover body 32, such that the blades 60 rotate along with the first cover body 31 and the second body 32.

Preferably, the rotatable device also comprises a sleeve cover 33. The sleeve cover 33 is fixed to the first cover body 31 by screws. The mounting seat 40 is disposed inside the sleeve cover 33 and extends out of the sleeve cover 33. An accommodation cavity 103 is provided between an inner wall of the sleeve cover 33 and an outer wall of the mounting seat 40.

Preferably, a first installation portion 36 is provided on the first cover body 31. One end of the first electrical conductive ring 42 is connected with the first installation portion 36, another end of the first electrical conductive ring 42 passes through the sleeve cover 33 and extends into the accommodation cavity. One end of the second electrical conductive ring 44 is connected with a second installation portion 37, another end of the second electrical conductive ring 44 passes through the sleeve cover 33 and extends into the accommodation cavity.

The present invention also provides a windmill, comprising a supporting shaft, a rotary body 30 provided on the supporting shaft, blades 60 provided on the rotary body 30, lights 70 provided on the blades 60 and a power supply that supplies power to the lights 70. The supporting shaft is a supporting tube 10. A bearing 20 sleeves on the supporting tube 10. The bearing 20 comprises an outer ring 21 and an inner ring 22 that are mutually rotatable with respect to each other. The rotary body 30 is connected with the outer ring 21. The windmill also comprises a mounting seat 40 mounted on the supporting tube 10, an electrical conductive member and a brush cooperating with the electrical conductive member. One of the electrical conductive member and the brush is connected to the rotary body 30, and another one of the electrical conductive member and the brush is connected to the mounting seat 40. Specifically, the rotary body 30 comprises a first cover body 31 and a second cover body 32. A bearing seat 311 is provided on the second cover body 32. A shaft hole is provided on the bearing seat 311. The outer ring 21 of the bearing 20 is accommodated into and abuts against the bearing seat 311. The inner ring 22 is positioned corresponding to the shaft hole and does not abut against the bearing seat 311. A supporting platform 11 can be additionally provided on the supporting tube 10 for abutment of the inner ring 22. An abutment seat which the bearing 20 abuts against is corresponding provided on the second cover body 32. The abutment seat abuts against the outer ring 21. The bearing seat 311 and the abutment seat described herein define the first clamping portion 34 and the second clamping portion 35 described above, such that the first cover body 31 and the second cover body 32 clamp the outer ring 21 and rotate along with the outer ring 21. In the present invention, the windmill also comprises an end cap 90. The blades can be provided between the end cap 90 and the second cover body 32 by way of clamping. The end cap 90 and the second cover body 32 are connected together via screws, such that the blades 60 are clamped tightly between the end cap 90 and the second cover body 32. Alternatively, the blades 60 can be directly welded to a side wall of the second cover body 32.

Preferably, the power supply comprises a power supply seat 80 and a solar battery component 81 disposed on the power supply seat 80. The power supply seat 80 is connected onto a frame (not shown in the figure; the frame can be an upright rod shape object). The solar battery component 81 absorbs solar energy and transforms the solar energy to electricity and then stores up the electricity generated. The solar battery component 81 has a structure that is disclosed in the prior art. Therefore, the solar battery component 81 will not be described in detail herein. A side wall of the power supply seat 80 is provided with a threaded hole. The supporting tube 10 is laterally threaded into the threaded hole. The electrical conductive member and the solar battery component 81 are electrically connected via a first conductive wire. The first conductive wire is arranged inside the supporting tube 10. The lights 70 are electrically connected to the brush via a second conductive wire. In this embodiment, a first brush 51 and a second brush 52 are mounted to the second cover body 32. Under the effect of wind power, the blades 60 drive the first cover body 31, the second body 32 and the outer ring 21 to rotate around the supporting tube 10. During rotation, the first brush 51 brushes the first electrical conductive ring 42 and the second brush 52 brushes the second electrical conductive ring 44 so that electricity is transferred to the first electrical conductive ring 42 and the second electrical conductive ring 44. The first electrical conductive ring 42 and the second electrical conductive ring 44 help transfer the electricity to the lights 70.

In the present invention, two supporting tubes 10 are provided, which are positioned symmetrically at two sides of the power supply seat 80. On each supporting tube 10, said rotary body 30 is configured. A solar battery panel of the solar battery component 81 is positioned at an upper surface of the power supply seat 81 for better absorption of solar energy.

According to the embodiments of the present invention, when wind power acts onto the blades 60, the blades 60 drive the rotary body 30 to rotate. The blades 60 can also illuminate during rotation, thereby achieving good ornamental effects. The present invention can also rotate the rotary body by using a motor. For example, a gear can be provided on the output shaft of the motor, and a gear rack matching the gear can be provided along the circumference of the rotary body. Therefore, the rotary body is rotated by being driven by the motor. In case wind power is not available, the blades can still rotate and illuminate by being driven by electricity. The present invention may also use the output shaft of the motor as the supporting shaft, and according to this configuration, power supply device can achieve rotation of the supporting shaft while the rotary body is remained not rotated.

The present invention should not be limited to the embodiments and the illustrations in the drawings. Any appropriate changes or modifications in accordance with the teachings of the present invention should also fall within the scope of protection of the present invention.

What is claimed is:

1. A rotatable device powered by continued electricity supply, comprising a supporting shaft, a bearing that sleeves the supporting shaft, a rotary body connected to the bearing, a mounting seat mounted on the supporting shaft, an electrical conductive member, and a brush that cooperates with the electrical conductive member; the bearing comprises an outer ring and an inner ring that are mutually rotatable with respect to each other; the rotary body is connected to the outer ring; one of the electrical conductive member and the brush is connected to the rotary body, and another one of the electrical conductive member and the brush is connected to the mounting seat; a wiring channel is provided on the supporting shaft for arrangement of wires; the supporting shaft is a supporting tube; the mounting seat comprises a sleeve portion that sleeves on the supporting tube, a first electrical conductive ring that sleeves on the sleeve portion, an insulating sleeve that sleeves on the sleeve portion, a second electrical conductive ring that sleeves on the sleeve portion, and a position limiting sleeve that sleeves on the sleeve portion; the insulating sleeve is positioned between the first electrical conductive ring and the second electrical conductive ring; the first electrical conductive ring and the second electrical conductive ring form the electrical conductive member; the brush comprises a first brush cooperating with the first electrical conductive ring and a second brush cooperating with the second electrical conductive ring; one end of the sleeve portion along an axial direction thereof abuts against an end surface of the inner ring along an axial direction thereof, and another end of the sleeve portion along the axial direction thereof is provided with a position limiting member that prevents the mounting seat from falling off from the supporting tube; an outer wall of the supporting tube is provided with a supporting platform; one end of the inner ring along the axial direction thereof abuts against the supporting platform, another end of the inner ring along the axial direction thereof abuts against the sleeve portion; the sleeve portion is mounted on the supporting tube in a way that the sleeve portion is not rotatable with respect to the supporting tube, the first electrical conductive ring is mounted on the sleeve portion in a way that the first electrical conductive ring is not rotatable with respect to the sleeve portion, and the second electrical conductive ring is mounted on the sleeve portion in a way that the second electrical conductive ring is not rotatable with respect to the sleeve portion; an outer wall of the sleeve portion is provided with a first key slot and a second key slot running along the axial direction of the sleeve portion; an inner wall of the first electrical conductive ring is provided with a first key that matches with the first key slot; an inner wall of the second electrical conductive ring is provided with a second key that matches with the second key slot.

2. The rotatable device of claim 1, wherein the outer wall of the sleeve portion is also provided with a first conductive wire slot and a second conductive wire slot running along the axial direction of the sleeve portion; the inner wall of the first electrical conductive ring is disposed corresponding to the first conductive wire slot; the inner wall of the second electrical conductive ring is disposed corresponding to the second electrical conductive wire slot.

3. The rotatable device of claim 1, wherein an outer wall of the supporting tube is provided with a threaded portion; the position limiting member is a nut threaded to the supporting tube.

4. The rotatable device of claim 1, wherein the rotary body comprises a first cover body and a second cover body; a first clamping portion is formed on the first cover body; a second clamping portion is formed on the second cover body; two ends of the outer ring along an axial direction thereof abut against the first clamping portion and the second clamping portion respectively; the first cover body and the second cover body are fixed together with each other by screws; the rotatable device also comprises a sleeve cover; the sleeve cover is fixed to the first cover body by screws; the mounting seat is disposed inside the sleeve cover and extends out of the sleeve cover; an accommodation cavity is provided between an inner wall of the sleeve cover and an outer wall of the mounting seat; a first installation portion is provided on the first cover body; one end of the first electrical conductive ring is connected with the first installation portion, another end of the first electrical conductive ring passes through the sleeve cover and extends into the accommodation cavity; one end of the second electrical conductive ring is connected with a second installation portion, another end of the second electrical conductive ring passes through the sleeve cover and extends into the accommodation cavity.

* * * * *